US006588867B1

(12) United States Patent
Darr

(10) Patent No.: US 6,588,867 B1
(45) Date of Patent: Jul. 8, 2003

(54) RECIPROCAL INDEX LOOKUP FOR BTSC COMPATIBLE COEFFICIENTS

(75) Inventor: Roger Darr, Sugar Hill, GA (US)

(73) Assignee: Arris International, Inc., Duluth, GA (US)

( * ) Notice: Subject to any disclaimer, the term of this patent is extended or adjusted under 35 U.S.C. 154(b) by 0 days.

(21) Appl. No.: 09/506,989

(22) Filed: Feb. 18, 2000

Related U.S. Application Data

(63) Continuation-in-part of application No. 09/342,803, filed on Jun. 29, 1999.

(60) Provisional application No. 60/120,608, filed on Feb. 18, 1999.

(51) Int. Cl.[7] .................................................. H04N 7/12

(52) U.S. Cl. .................................. 325/240.07; 348/485

(58) Field of Search ....................... 375/240.07, 240.05, 375/322, 240.12; 348/485, 481, 738

(56) References Cited

U.S. PATENT DOCUMENTS 5,744,742 A * 4/1998 Lindemann et al. .......... 84/623
6,327,391 B1 * 12/2001 Ohnishi et al. ............. 382/236

* cited by examiner

*Primary Examiner*—Emmanuel P Bayard

(57) ABSTRACT

In a method of calculating a variable spectral compression filter coefficient in a BTSC compatible stereo encoder from a feedback variable, a reciprocal value that is proportional to a reciprocal of the feedback variable is calculated. A lookup table is indexed using a preselected set of bits of the reciprocal value to generate at least one parameter of the filter coefficient function. An approximation of the compression filter coefficient is linearly interpolated based on the at least one parameter of the filter coefficient function. An apparatus that includes circuitry that calculates a variable spectral compression filter coefficient in a BTSC compatible stereo encoder from a feedback variable includes a reciprocal value circuit that calculates a proportional to a reciprocal value of the feedback variable. The apparatus also includes a lookup table that is indexed by a preselected set of high order bits of the reciprocal value, wherein a first portion of the lookup table stores a plurality of discrete values at index points of a line segment corresponding to a filter coefficient function approximation, so as to generate an initial discrete value corresponding to the filter coefficient function at a value of the high order bits, and wherein a second portion of the lookup table stores a plurality of slope values, each slope value indicating a slope of a line segment of the filter coefficient function, so as to generate a slope value of a line segment corresponding to the filter coefficient function at the value of the high order bits. A linear interpolation circuit interpolates an approximation of the compression filter coefficient based on the slope value, the initial discrete value and a preselected set of low order bits of the reciprocal value.

10 Claims, 7 Drawing Sheets

RECIPROCAL INDEX LOOKUP FOR BTSC COMPATIBLE COEFFICIENTS

CROSS-REFERENCE TO PROVISIONAL APPLICATION

This application claims priority under 35 U.S.C. §119(e) on provisional patent application Ser. No. 60/120,608 filed on Feb. 18, 1999.

CROSS-REFERENCE TO RELATED APPLICATION

This is a continuation-in-part of our copending patent application Ser. No. 09/342,803 filed on Jun. 29, 1999, the disclosure for which is incorporated herein by reference.

BACKGROUND OF THE INVENTION

1. Field of the Invention

The present invention relates to communications systems and, more specifically, to an apparatus and method for determining BTSC filter coefficients.

2. Description of the Prior Art

BTSC-compatible encoders are used to encode stereo audio signals into television signals. Existing systems typically use an analog approach. The analog approach is environmentally sensitive and requires extra circuitry to be compatible with digital television systems.

Existing digital BTSC require complex circuitry to facilitate determination of BTSC filter coefficients. Such circuitry is made complex because the feedback functions used to calculate the coefficients tend to exhibit a sharp bend, thereby causing the function to behave in a nonlinear fashion. Such non-linearity reduces the precision of interpolated coefficients.

Therefore, there is a need for a circuit that employs a nearly linear aspect of the BTSC feedback function to facilitate more precise interpolation of BTSC filter coefficients.

SUMMARY OF THE INVENTION

The disadvantages of the prior art are overcome by the present invention, which in one aspect is a method of calculating a variable spectral compression filter coefficient in a BTSC compatible stereo encoder from a feedback variable. A reciprocal value that is proportional to a reciprocal of the feedback variable is calculated. A lookup table is indexed using a preselected set of bits of the reciprocal value to generate at least one parameter of the filter coefficient function. An approximation of the compression filter coefficient is linearly interpolated based on the at least one parameter of the filter coefficient function.

In another aspect, the invention is a method of calculating a variable spectral compression filter coefficient in a BTSC compatible stereo encoder from a feedback variable. A reciprocal value that is proportional to a reciprocal of the feedback variable is calculated. A lookup table is indexed using a preselected set of high order bits of the reciprocal value. A first portion of the lookup table stores a plurality of discrete values at index points of a line segment corresponding to a filter coefficient function approximation. The first portion of the lookup table generates an initial discrete value corresponding to the filter coefficient function at a value of the high order bits. A second portion of the lookup table stores a plurality of slope values with each slope value indicating a slope of a line segment of the filter coefficient function. The second portion of the lookup table generates a slope value of a line segment corresponding to the filter coefficient function at the value of the high order bits. An approximation of the compression filter coefficient is linearly interpolated based on the slope value, the initial discrete value and a preselected set of low order bits of the reciprocal value.

In yet another aspect, the invention is an apparatus that includes circuitry that calculates a variable spectral compression filter coefficient in a BTSC compatible stereo encoder from a feedback variable. The apparatus includes a reciprocal value circuit that calculates a reciprocal value that is proportional to a reciprocal value of the feedback variable. The apparatus also includes a lookup table that is indexed by a preselected set of high order bits of the reciprocal value, wherein a first portion of the lookup table stores a plurality of discrete values at index points of a line segment corresponding to a filter coefficient function approximation, so as to generate an initial discrete value corresponding to the filter coefficient function at a value of the high order bits, and wherein a second portion of the lookup table stores a plurality of slope values, each slope value indicating a slope of a line segment of the filter coefficient function, so as to generate a slope value of a line segment corresponding to the filter coefficient function at the value of the high order bits. A linear interpolation circuit interpolates an approximation of the compression filter coefficient based on the slope value, the initial discrete value and a preselected set of low order bits of the reciprocal value.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
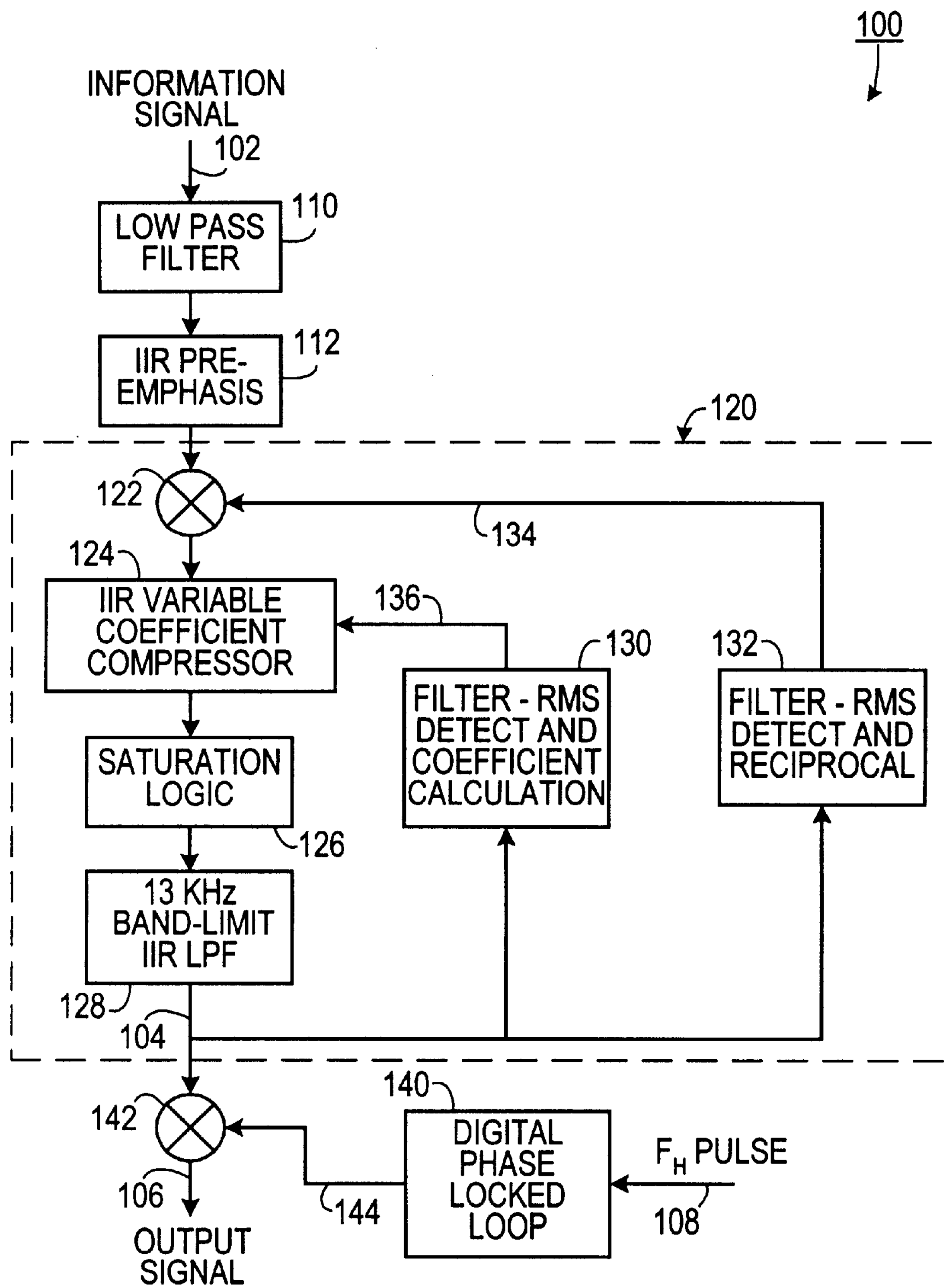
FIG. 1 is a schematic diagram of a BTSC-compatible encoder according to one embodiment of the invention.

A preferred embodiment of the invention is now described in detail. Referring to the drawings, like numbers indicate like parts throughout the views. As used herein, a digital BTSC-compatible stereo television difference signal is a digital stereo signal that can be decoded by a decoder that complies with the BTSC stereo television standard.

As shown in FIG. 1, in one illustrative embodiment of the invention, the BTSC-compatible encoder is an application specific integrated circuit 100 in which a low pass filter 110 receives a digital representation 102 of an audio signal having a sample rate of $F_S$. The audio signal could include both left and right components or it could include sum and difference components, depending upon the specific application. The low pass filter 110 generates a corresponding second digital signal having a pseudo-interpolated sampling rate of 4 $F_S$. A digital infinite impulse response pre-emphasis filter 112 generates a pre-emphasized output signal corresponding to the second digital signal, in accordance with the BTSC standard. A digital signal compressor 120 receives the pre-emphasized output signal and generates a compressed digital difference signal 104.

Figure 3:
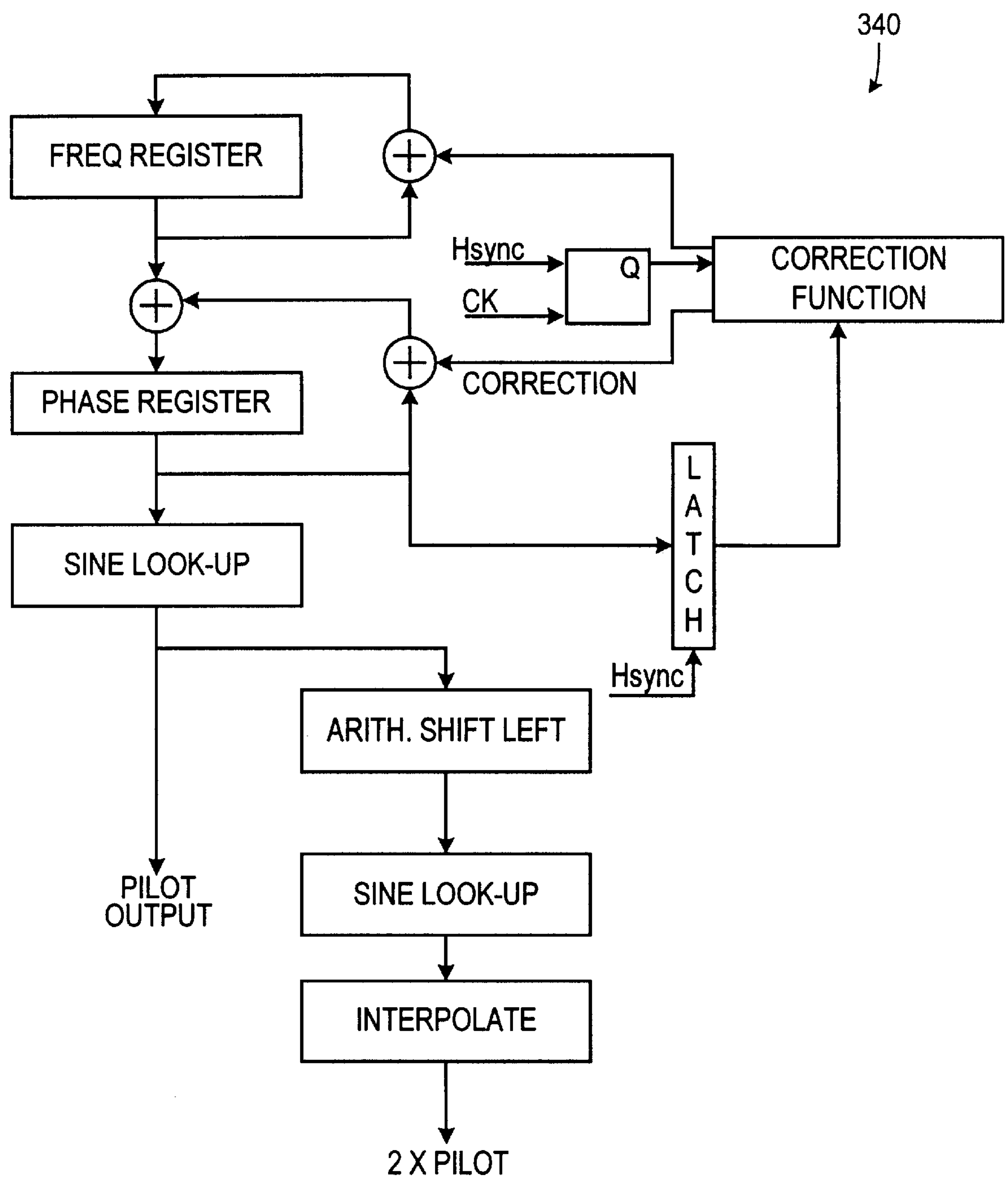
FIG. 3 is a schematic diagram of a digital phase locked loop employed in the embodiment of FIG. 1.

A digital phase locked loop 140 that is responsive to a video sync pulse 108 having a sync pulse frequency ($F_H$) generates a third digital signal 144 corresponding to a sinusoid having a frequency equal to twice the sync pulse frequency and a having a sampling frequency equal to 4 $F_S$. A first digital multiplier 142 multiplies the compressed digital signal 104 by the third digital signal 144 to generate a digital BTSC-compatible stereo television difference signal 106. One embodiment 340 of the digital phase locked loop 140 is shown in FIG. 3.

Figure 2:
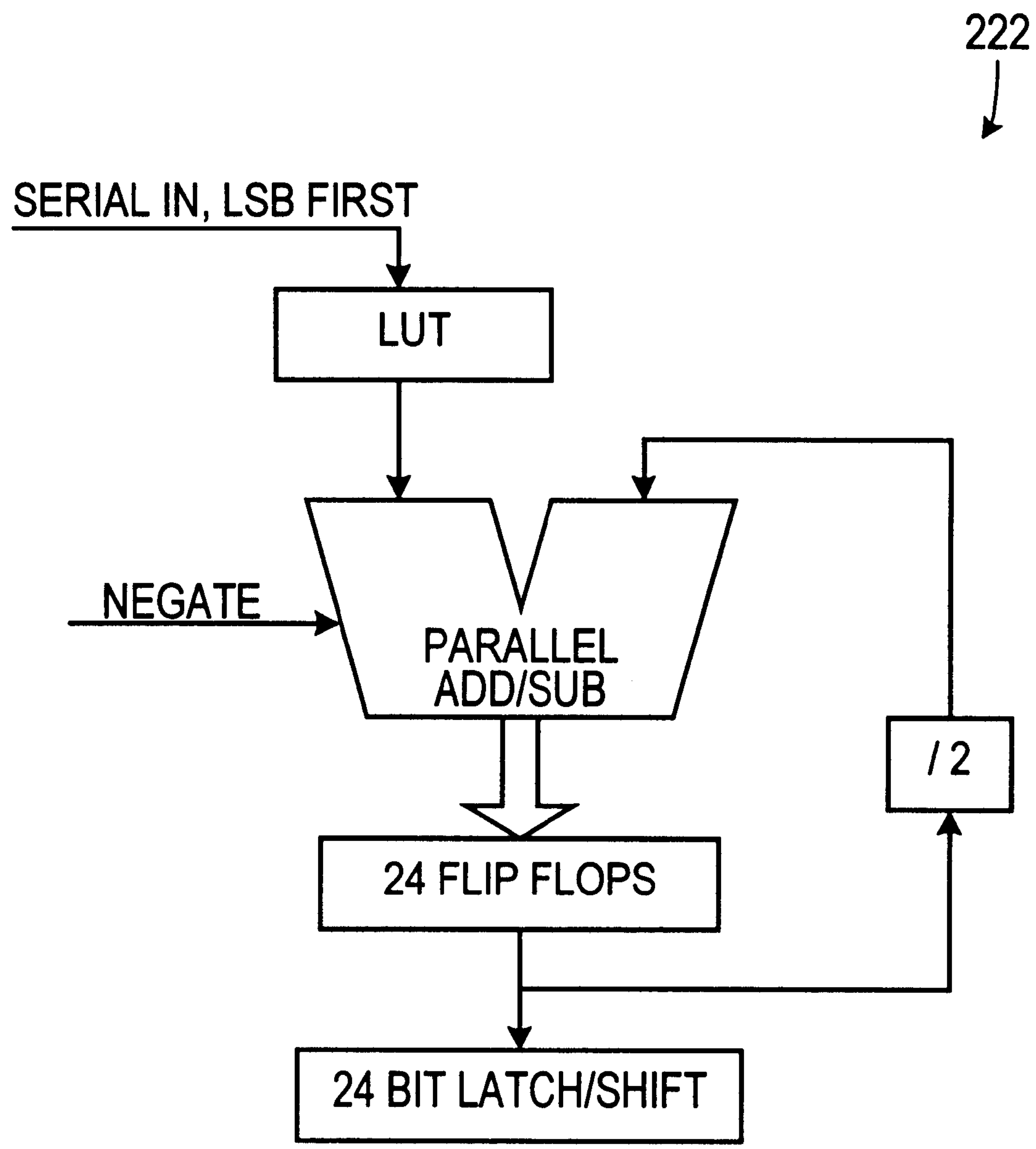
FIG. 2 is a schematic diagram of a serial multiplier employed in the embodiment of FIG. 1.

Returning to FIG. 1, the digital signal compressor 120 includes a second digital multiplier 122 that multiplies the pre-emphasized output signal by a first feedback signal 134, thereby generating a digital feedback-multiplied signal. (The multiplier could be a serial multiplier 222 of the type shown in FIG. 2.) An infinite impulse response variable coefficient compressor 124, that is responsive to the feedback-multiplied signal and responsive to a digital coefficient feedback signal 136, generates a digital dynamic range-limited signal corresponding to the feedback-multiplied signal limited to a predetermined dynamic range. Essentially, the infinite impulse response variable coefficient compressor 124 narrows the dynamic range of the feedback-multiplied signal. A saturation logic circuit 126 generates a digital amplitude-limited signal corresponding to the digital dynamic range-limited signal limited to a predetermined amplitude range. A digital band-limited infinite impulse response low pass filter 128, that is responsive to the amplitude-limited signal, generates a digital band-limited signal corresponding to the amplitude-limited signal that serves as the compressed digital difference signal 104. In the disclosed embodiment, the digital band-limited infinite impulse response low pass filter 128 cuts off signals above 13 KHz, thereby eliminating certain harmonics.

Figure 4:
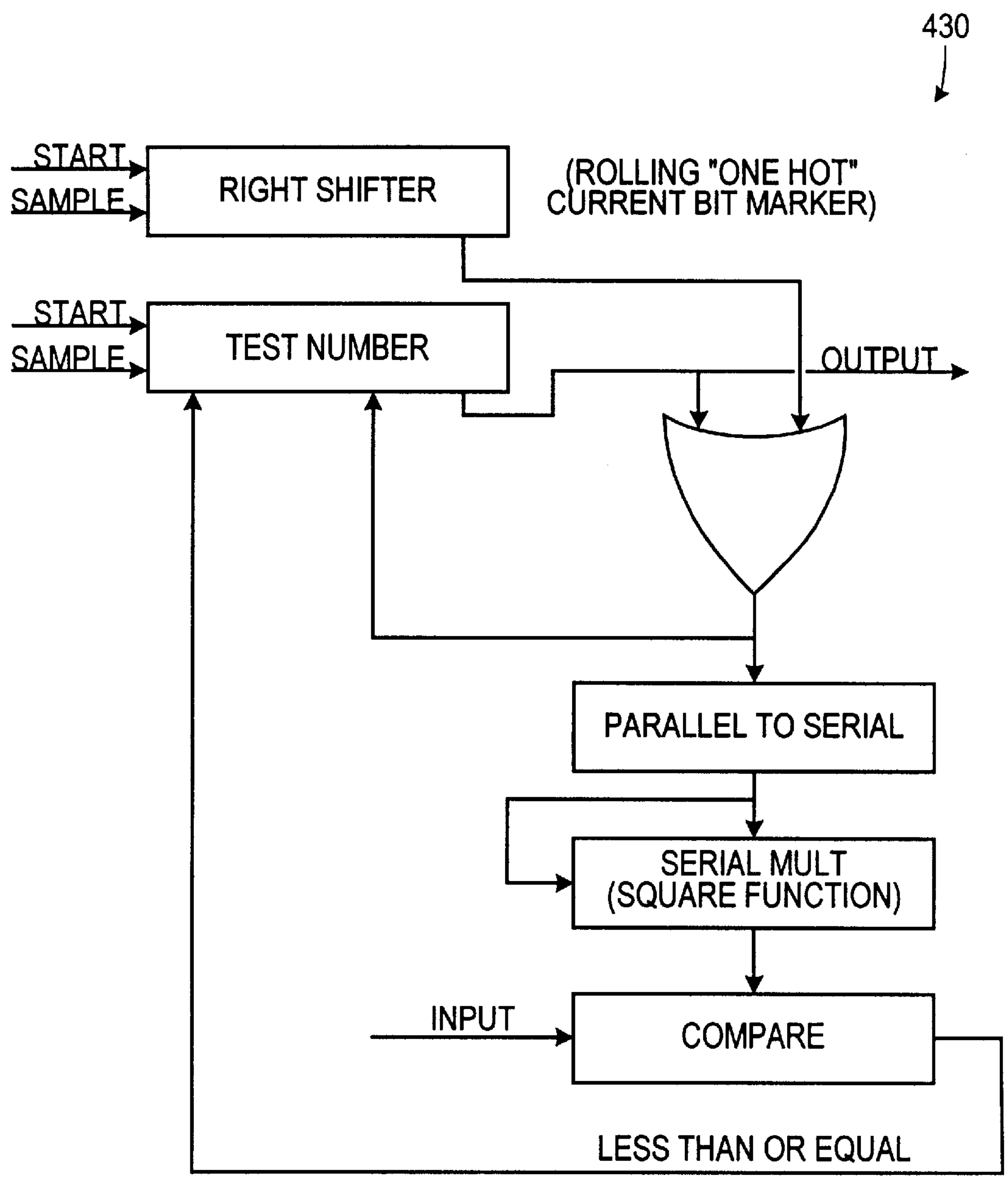
FIG. 4 is a schematic diagram of a positive square root finder employed in the embodiment of FIG. 1.
Figure 5:
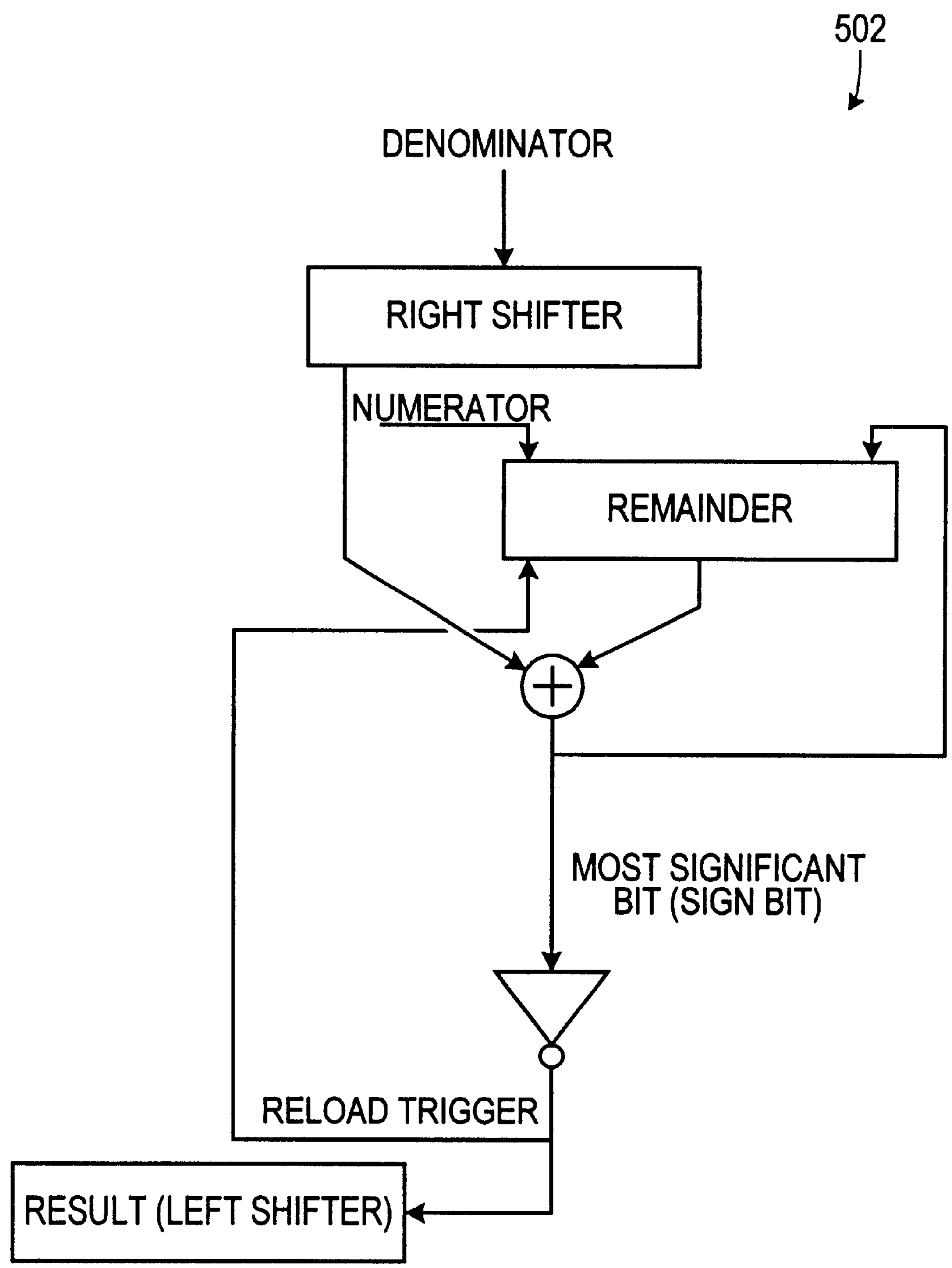
FIG. 5 is a schematic diagram of a serial divider employed in the embodiment of FIG. 1.

A first feedback circuit 130, that is responsive to the band-limited signal, includes a root-mean-squared (RMS) level detector and generates the first feedback signal indicative of an amplitude of the band-limited signal (In one embodiment, the RMS level detector includes a positive square root finder 430, as shown in FIG. 4.) The first feedback circuit 130 also includes a band pass filter that passes signals in a relatively higher frequency range. In the disclosed embodiment, this filter passes frequencies around 11 KHz. A second feedback circuit 132, responsive to the band-limited signal, generates the coefficient feedback signal based on the band-limited signal. The second feedback circuit 132 also includes an RMS level detector and a band pass filter that passes lower frequencies. In the disclosed embodiment, this frequency range is between approximately 30 Hz and 3000 Hz. The second feed back circuit 132 also employs a divider 502 (as shown in FIG. 5) to generate a reciprocal signal value.

Figure 6A:
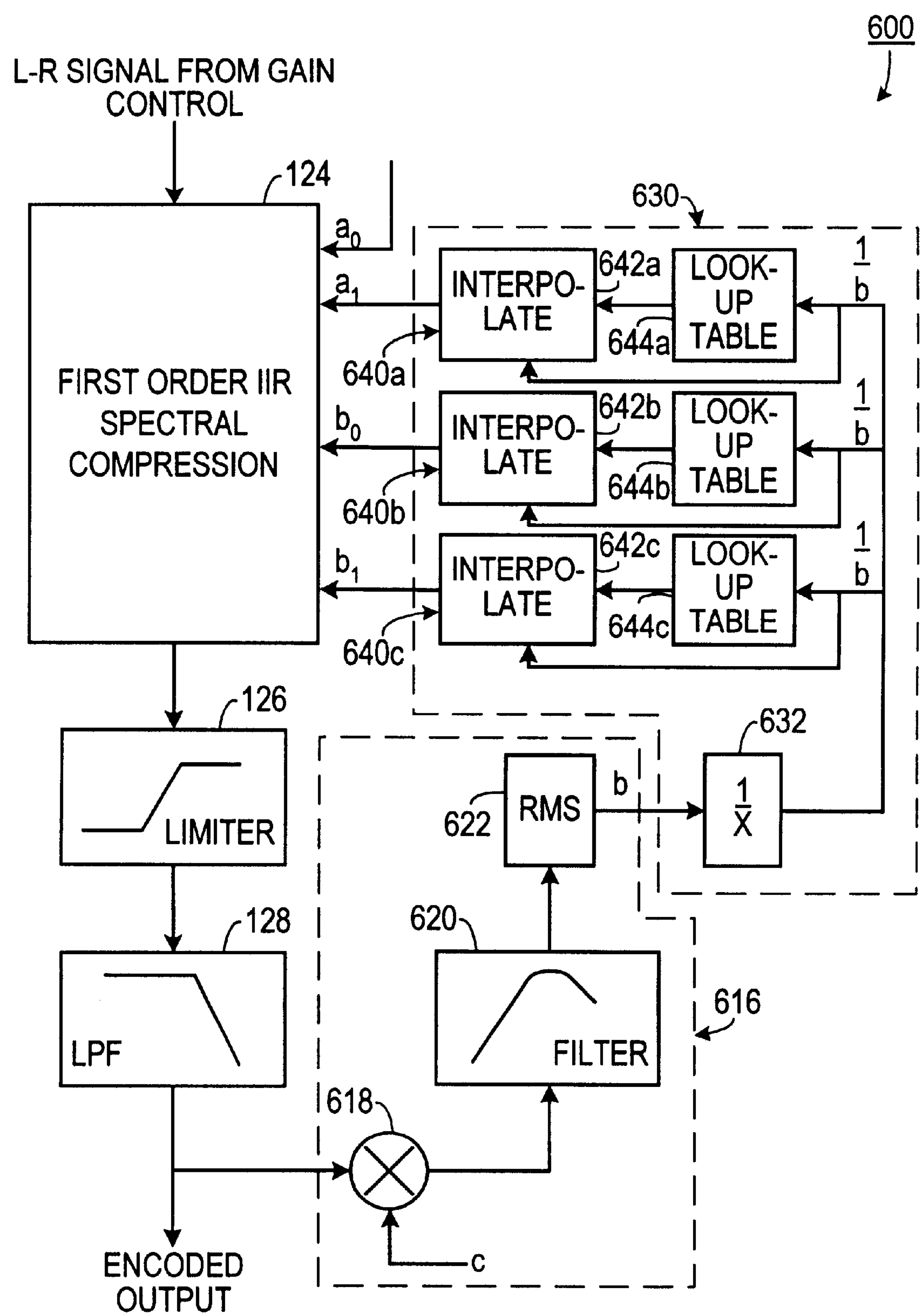
FIG. 6A is a schematic diagram of a circuit that generates filter coefficients, in accordance with one aspect of the invention.

The digital coefficient feedback signal 136 may actually comprise several variable spectral compression filter coefficients. As shown in FIG. 6A, in one illustrative embodiment, a coefficient calculating circuit 630 calculates the filter coefficients $a_0$, $a_1$, $b_0$, and $b_1$ from a feedback variable that was output by the variable coefficient compressor 124, which in one embodiment is a first order Infinite Impulse Response (IIR) filter. Each filter coefficient $a_1$, $b_0$, and $b_1$ is calculated by a different approximating circuit 640*a* (for $a_1$), 640*b* (for $b_0$) and 640*c* (for $b_1$). (In this embodiment, the value for $a_0$ is set at a constant value of "1.") While for this embodiment the IIR requires four filter coefficients, it will be understood that other IIR's could require a different number of filter coefficients.

The coefficient calculating circuit 630 includes a reciprocal value circuit 632 that calculates a reciprocal value that is proportional to a reciprocal value of the feedback variable. A lookup table 644 is indexed by the high order bits of the reciprocal value. A first portion of the lookup table 644 stores a plurality of discrete values at index points of a line segment corresponding to a filter coefficient function approximation. The first portion of the lookup table 644 generates an initial discrete value corresponding to the filter coefficient function at a value of the high order bits. A second portion of the lookup table 644 stores a plurality of slope values, wherein each slope value indicates a slope of a line segment of the filter coefficient function. The second portion of the lookup table 644 generates a slope value of the line segment corresponding to the filter coefficient function at the value of the high order bits. As would be understood by one of skill in the art that the lookup table 644 could include several physically separate lookup tables with each indexed by the high order bits.

Because of the nature of the coefficient functions, the coefficient functions of the reciprocal of the feedback variable tend to behave more linearly than the coefficient functions the non-reciprocal feedback variable. Therefore, using the reciprocal of the feedback variable to index the lookup table 642 allows for the use of linear interpolation to approximate the filter coefficients $a_0$, $a_1$, $b_0$, and $b_1$.

Figure 6B:
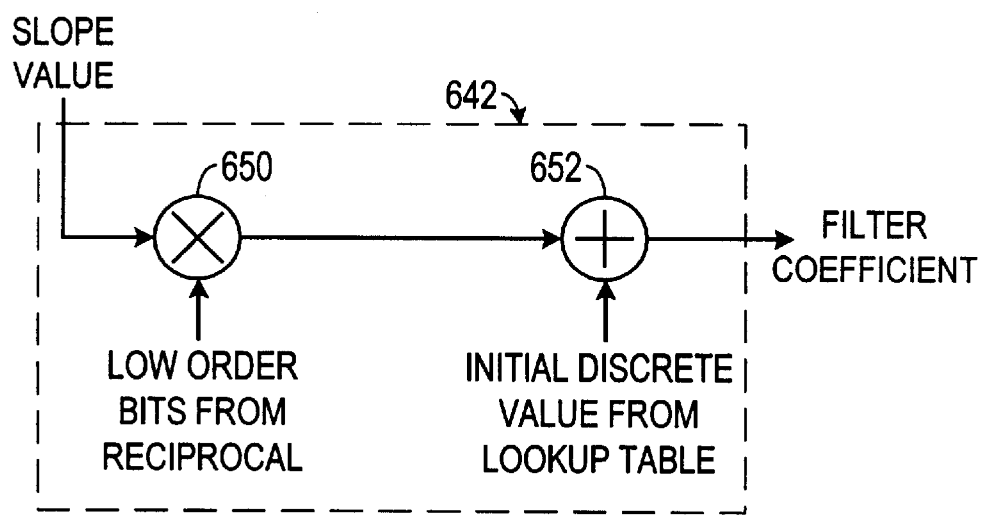
FIG. 6B is a schematic diagram of an interpolation circuit.

A linear interpolation circuit 642 interpolates an approximation of the compression filter coefficient based on the slope value, the initial discrete value and a preselected set of low order bits of the reciprocal value. In one embodiment, as shown in FIG. 6B, the interpolation circuit 642 includes a multiplier 650 that multiplies the slope value by the value of the low order bits of the reciprocal value to generate a product value. An adder 652 adds the initial discrete value from the lookup table 644 to the product value, thereby generating an approximation of the compression filter coefficient.

Returning to FIG. 6A, a feedback signal conditioning circuit 616 conditions the signal for use by the coefficient calculating circuit 630. The signal conditioning circuit 616 includes a multiplier 618 that multiplies the encoded output of the low pass filter 128 by a scaling constant c to generate a scaled version of the encoded output. A band pass filter 620 weighted to high generates a filtered signal from the scaled signal. A root-mean-squared 622 circuit generates a root-mean-squared version of the output of the conditioning circuit 616. The root-mean-squared version of the output of the conditioning circuit 616 is then transmitted to the coefficient calculating circuit 630.

Figure 6C:
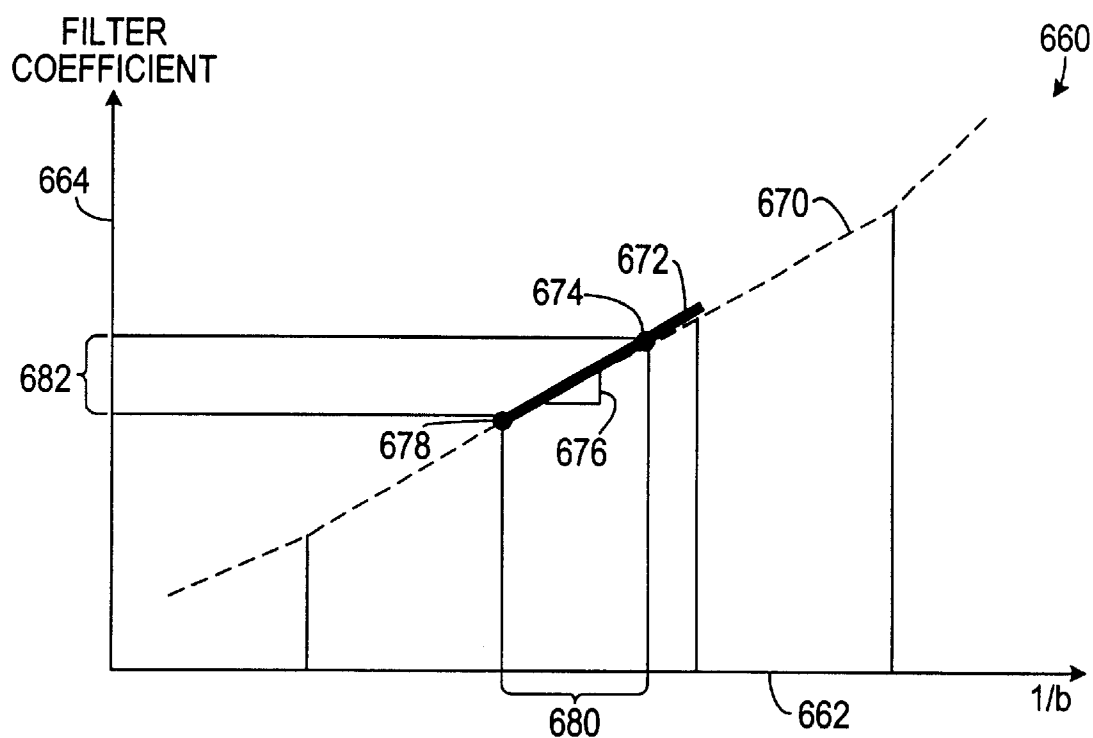
FIG. 6C is a graph showing one implementation of linear interpolation.

One illustrative implementation of linear interpolation that may be used with the invention is shown in FIG. 6C. As shown in FIG. 6C, the coefficient function 670 may be plotted on a graph 660 having a 1/b axis 662 and a filter coefficient axis 664. The high order bits of 1/b are used to index the lookup table to retrieve two parameters of a line segment 672 that locally approximates the filter coefficient function 670. The retrieved parameters include an initial value 678 of the line segment 672 and the slope 676 of the line segment. The low order bits 680 of 1/b times the slope 676 give a filter coefficient axis 664 offset 682 from the initial value 678 to provide the approximate value 674 of the filter coefficient.

The overall design strategy of the circuit disclosed includes: limiting output bandwidth to 13 KHz to simplify filter requirements; employing linear interpolation to two times the input sampling frequency before pre-emphasis; employing linear interpolation to four times the input sampling frequency, $F_S$, before bandwidth-limit filter; allowing the bandwidth limit filter to remove residual images from the interpolation; using the digital phase locked loop 140 to create sinusoidal $F_H$, and 2 $F_H$ at 4 $F_S$; and modulating the left and right components of the audio signal by 2 $F_H$ and inserting the $F_H$, pilot digitally. All of this may be embodied on an application specific integrated circuit to reduce costs.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A method of calculating a variable spectral compression filter coefficient in a BTSC compatible stereo encoder from a feedback variable, comprising the steps of:

a. calculating a reciprocal value that is proportional to a reciprocal of the feedback variable;

b. indexing a lookup table using a preselected set of bits of the reciprocal value to generate at least one parameter of a filter coefficient function; and c. linearly interpolating an approximation of the compression filter coefficient based on the at least one parameter of the filter coefficient function.

2. A method of calculating a variable spectral compression filter coefficient in a BTSC compatible stereo encoder from a feedback variable, comprising the steps of:

a. calculating a reciprocal value that is proportional to a reciprocal of the feedback variable;

b. indexing a lookup table using a preselected set of high order bits of the reciprocal value, wherein a first portion of the lookup table stores a plurality of discrete values at index points of a line segment corresponding to a filter coefficient function approximation, so as to generate an initial discrete value corresponding to the filter coefficient function at a value of the high order bits, and wherein a second portion of the lookup table stores a plurality of slope values, each slope value indicating a slope of a line segment of the filter coefficient function, so as to generate a slope value of a line segment corresponding to the filter coefficient function at the value of the high order bits; and c. linearly interpolating an approximation of the compression filter coefficient based on the slope value, the initial discrete value and a preselected set of low order bits of the reciprocal value.

3. The method claim 2, wherein the interpolating step comprises the steps of:

a. multiplying the slope value by a value of the preselected set of low order bits of the reciprocal value to generate a product value; and b. adding the initial discrete value to the product value thereby generating the approximation of the compression filter coefficient.

4. The method claim 2, further comprising the step of generating the compression filter coefficient by calculating a root-mean-squared value of a scaled and filtered output of an infinite impulse response spectral compression filter.

5. An apparatus for calculating a variable spectral compression filter coefficient in a BTSC compatible stereo encoder from a feedback variable, comprising:

a. a reciprocal value circuit that calculates a reciprocal value that is proportional to a reciprocal of the feedback variable;

b. a lookup table that is indexed by a preselected set of high order bits of the reciprocal value, wherein a first portion of the lookup table stores a plurality of discrete values at index points of a line segment corresponding to a filter coefficient function approximation, so as to generate an initial discrete value corresponding to the filter coefficient function at a value of the high order bits, and wherein a second portion of the lookup table stores a plurality of slope values, each slope value indicating a slope of a line segment of the filter coefficient function, so as to generate a slope value of a line segment corresponding to the filter coefficient function at the value of the high order bits; and c. a linear interpolation circuit that interpolates an approximation of the compression filter coefficient based on the slope value, the initial discrete value and a preselected set of low order bits of the reciprocal value.

6. The apparatus of claim 5, wherein the interpolation circuit comprises:

a. a multiplier that multiplies the slope value by a value of a preselected set of low order bits of the reciprocal value to generate a product value; and b. an adder that adds the initial discrete value to the product value, thereby generating an approximation of the compression filter coefficient.

7. The apparatus of claim 5, further comprising a feedback signal conditioning circuit that generates a scaled, filtered and root-mean-squared signal corresponding to a, output of an infinite impulse response spectral compression filter.

8. The apparatus of claim 7, wherein the feedback signal conditioning circuit comprises a multiplier that multiplies the output of an infinite impulse response spectral compression filter by a scaling constant thereby generating a scaled signal.

9. The apparatus of claim 8, wherein the feedback signal conditioning circuit further comprises a band pass filter weighted to high that generates a filtered signal from the scaled signal.

10. The apparatus of claim 9, wherein the feedback signal conditioning circuit further comprises a root-mean-squared circuit that generates a root-mean-squared signal corresponding to a value of the scaled signal root-mean-squared.

* * * * *